United States Patent
Narita et al.

(10) Patent No.: US 9,534,061 B2
(45) Date of Patent: Jan. 3, 2017

(54) METHODS FOR PREPARING ALKALI CELLULOSE AND CELLULOSE ETHER

(75) Inventors: Mitsuo Narita, Joetsu (JP); Masaki Tabata, Joetsu (JP); Atsushi Yoshida, Joetsu (JP); Hiroshi Umezawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/615,437

(22) Filed: Dec. 22, 2006

(65) Prior Publication Data

US 2007/0149774 A1    Jun. 28, 2007

(30) Foreign Application Priority Data

Dec. 27, 2005  (JP) ................. 2005-375206
Dec. 8, 2006   (JP) ................. 2006-332453

(51) Int. Cl.
    *C08B 1/08*      (2006.01)
    *C08B 1/10*      (2006.01)
    *C08B 11/00*     (2006.01)
    *C08B 11/193*    (2006.01)

(52) U.S. Cl.
    CPC . *C08B 1/08* (2013.01); *C08B 1/10* (2013.01); *C08B 11/193* (2013.01)

(58) Field of Classification Search
    CPC .............. C08B 1/08; C08B 1/10; C08B 11/00
    USPC ............... 536/84, 85, 101, 124, 127
    See application file for complete search history.

(56) References Cited

U.S. PATENT DOCUMENTS

| | | | |
|---|---|---|---|
| 1,973,491 A * | 9/1934 | Lilienfeld ............... | 536/101 |
| 2,106,111 A * | 1/1938 | Bayerl et al. ............ | 536/60 |
| 2,236,533 A * | 4/1941 | Hahn ..................... | 536/100 |
| 2,488,631 A * | 11/1949 | Kunz ..................... | 536/89 |
| 2,931,734 A * | 4/1960 | Durso .................... | 106/164.43 |
| 3,063,981 A | 11/1962 | Cochrane et al. | |
| 3,203,457 A * | 8/1965 | Minet .................... | 99/511 |
| 3,388,082 A | 6/1968 | Rodgers, Jr. et al. | |
| 4,075,279 A * | 2/1978 | Holst et al. ............. | 536/88 |
| 4,117,223 A | 9/1978 | Lodige et al. | |
| 4,310,663 A | 1/1982 | Hilbig et al. | |
| 4,339,573 A * | 7/1982 | Wust et al. ............. | 536/84 |
| 4,341,892 A | 7/1982 | Kuhne et al. | |
| 4,363,784 A | 12/1982 | Hilbig et al. | |
| 4,508,895 A | 4/1985 | Balser | |
| 5,840,882 A * | 11/1998 | Doenges et al. ....... | 536/91 |
| 6,392,033 B1 | 5/2002 | Poggi et al. | |
| 6,884,883 B1 * | 4/2005 | Shima et al. .......... | 536/56 |
| 2002/0099203 A1 | 7/2002 | Kobayashi | |
| 2004/0020854 A1 | 2/2004 | Ali et al. | |

FOREIGN PATENT DOCUMENTS

| | | |
|---|---|---|
| FR | 1 038 674 A | 9/1953 |
| GB | 229 678 A | 5/1926 |
| GB | 713 646 A | 8/1954 |
| JP | 49-61272 | 6/1974 |
| JP | 53-41356 | 4/1978 |
| JP | 56002302 | 1/1981 |
| JP | 56-145901 | 11/1981 |
| JP | 58-196202 | 11/1983 |
| JP | 60040101 | 3/1985 |
| JP | 1985050801 | 11/1985 |
| JP | 2001-002701 | 1/2001 |
| JP | 2001-518127 | 10/2001 |
| JP | 2002-256001 | 9/2002 |

OTHER PUBLICATIONS

*Cellulose No Jiten* (Encyclopedia of Cellulose), Edited by the Cellulose Society of Japan, Oct. 10, 2000.
Japanese Office Action from Japanese Patent Application No. 2006-332453, dated Feb. 7, 2012.

* cited by examiner

Primary Examiner — Patrick Lewis
Assistant Examiner — Everett White
(74) Attorney, Agent, or Firm — Alston & Bird LLP

(57) ABSTRACT

The invention is an efficient method for preparing alkali cellulose having the low water content and a uniform alkali distribution therein. More specifically, the invention is a method for continuously preparing alkali cellulose comprising steps of bringing pulp into continuous contact with an alkali metal hydroxide solution to generate a contact mixture and then draining the contact mixture by a centrifugal separator. The invention also includes a method for preparing cellulose ether comprising a step of etherifying the alkali cellulose.

15 Claims, 2 Drawing Sheets

METHODS FOR PREPARING ALKALI CELLULOSE AND CELLULOSE ETHER

BACKGROUND OF THE INVENTION

1. Field of the Invention

The present invention relates to alkali cellulose and a method for preparing cellulose ether using the same.

2. Description of the Related Art

For preparation of cellulose ether, known is a method comprising steps of bringing highly purified pulp into contact with an alkali solution to prepare alkali cellulose, and then etherifying the alkali cellulose with an etherifying agent. Although the cellulose ether obtained as a final product becomes soluble in water by properly controlling the degree of substitution, the cellulose ether contains a water-insoluble portion so that the light transmittance of the aqueous solution may be lowered or the commodity value of the cellulose ether may be damaged because the water-insoluble portion is considered as a foreign matter.

The insoluble portion is caused by the presence of a portion having a low degree of substitution which does not have enough substituents to permit dissolution of the cellulose ether in water. One of the causes is uneven alkali distribution in the alkali cellulose.

The rolls the alkali plays include (a) swelling the cellulose to change the crystal structure in the pulp, thereby accelerating the penetration of the etherifying agent, (b) catalyzing the etherification reaction of an alkylene oxide, and (c) serving as a reactant for an alkyl halide. A portion of the pulp out of contact with the aqueous alkali solution is not involved in the reaction and therefore remains as an insoluble portion. Thus, uniformity of the alkali cellulose is related to an amount of the insoluble portion in the alkali cellulose.

A method which has been employed widely for the preparation of alkali cellulose includes one described in Japanese Patent Application Examined Publication No. 60-50801/1985 or Japanese Patent Application Unexamined Publication No. 56-2302/1981 in which an alkali is added in an amount necessary for etherification to pulp powder obtained by pulverization of pulp, and then mixed mechanically. In this method, however, the alkali is not distributed to all parts of the pulp powder so that some parts of the pulp power remain out of contact with the alkali. As a result, some parts fail to become cellulose ether, stay in the product as an unreacted substance and deteriorate the quality of the cellulose ether. Thus, this method causes a problem.

In order to avoid causing such a problem, a method comprising steps of impregnating a sheet of pulp in an excess alkali solution to allow the pulp to absorb a sufficient amount of an alkali and then pressing the impregnated sheet to remove an unnecessary portion of the alkali and control the alkali to a predetermined amount. When this method is performed industrially, it is the common practice that a rolled pulp is allowed to be rotated freely by elevating the rolled pulp by a supporting shaft put through the central pipe of the roll so as to bring it up from a floor surface, or placing the rolled pulp over a roller. Then, a sheet is drawn from the rolled pulp and introduced into an immersion tank. However, according to this method, the operation is often interrupted because the pulp sheet is torn by a pull force during the immersion. Moreover, to achieve mass production, a huge immersion tank is required for immersing the pulp sheet therein for a predetermined time. Accordingly, this method has defects such as necessity of an adequate space for the tank and inevitable rise in the investment cost. On the other hand, when pulp chips are employed, the cake of them has an irregular surface so that the uneven squeeze occurs when pressed by the press machine. Uneven alkali distribution caused by the uneven squeeze deteriorates the quality of the alkali cellulose.

In page 433 of "Encyclopedia of Cellulose" edited by The Cellulose Society of Japan (published on Nov. 10, 2000), described is a preparation step of alkali cellulose for preparation of viscose, the step comprising adding pulp to an alkali solution to form a gruel-like slurry and squeezing the slurry by a slurry press. Although the defects caused by use of a sheet of pulp are solved, the slurry press causes uneven squeeze and thereby deteriorates the quality of the alkali cellulose due to uneven alkali distribution. In addition, it is difficult to obtain alkali cellulose having a relatively small alkali content which is required as a raw material of cellulose ether using this method alone because of the limitation of the squeeze performance. Thus, it is difficult to apply this method to the preparation of cellulose ether.

In Japanese Patent Application Examined Publication No. 3-73562/1991, described is a method for preparing alkali cellulose having a desired composition, comprising steps of preparing alkali cellulose from cellulose and excess alkali, and then washing the alkali cellulose with a hydrophilic solvent for removal of the alkali. However, this method needs huge equipment and many operations. In addition, the hydrophilic solvent remains in the alkali cellulose and causes a side reaction with an etherifying agent. Accordingly, a reaction efficiency of the etherifying agent is reduced. Neutralization of the washing liquid or recovery of the alkali is required. Thus, this method is industrially difficult.

According to the preparation method described in International Patent Application Japanese-Phase Publication No. 2001-518127, alkali cellulose having 0.316 to 0.643 of weight ratio of alkali metal hydroxide/cellulose is obtained as a raw material for preparation of viscose by dispersing a cellulose-containing material in an aqueous solution of sodium hydroxide and then subjecting the resulting dispersion to centrifugal separation. As described in the publication, only an aqueous solution of sodium hydroxide having a concentration of 14 to 22% by weight is usable in the method. The reason is as follows. Immersion time for the cellulose-containing material in the aqueous solution of sodium hydroxide during the dispersion of the material in the solution is not controlled or adjusted. Accordingly, the cellulose-containing material continues to absorb the aqueous sodium hydroxide solution until the absorption reaches almost a saturated amount. An aqueous solution of sodium hydroxide having a considerably low concentration must be employed in order to obtain alkali cellulose having a desired weight ratio of alkali metal hydroxide/cellulose. However, alkali cellulose prepared using an aqueous sodium hydroxide solution having such a low concentration is economically disadvantageous because a side reaction between an etherifying agent and water occurs in the subsequent step for preparing cellulose ether. In addition, the cellulose ether thus obtained cannot have a desired degree of substitution. Moreover, an aqueous solution of the cellulose ether thus prepared is inferior in transparency.

The utilization ratio of the etherifying agent correlates with the water content of the alkali cellulose. As the water content is smaller, the utilization ratio increases, meaning that a desired degree of substitution can be attained by a small amount of the etherifying agent.

As a preparation method of an alkali cellulose having a small water content, known is a method comprising suspending finely pulverized cellulose in an inert solvent, carrying out first-stage addition of sodium hydroxide in the solid form to partially swell the cellulose with the organic solvent in advance, and then carrying out second-stage addition of 40 to 60% sodium hydroxide solution (Japanese Patent Application Unexamined Publication No. 56-145901/1981). However, the cellulose ether prepared using the alkali cellulose obtained by the method is inferior in the transparency of its solution. It is also unsatisfactory from the economical viewpoint because sodium hydroxide in the solid form is expensive.

It is also known that alkali cellulose having a small water content is available by alkalizing cellulose with sodium hydroxide and washing the alkali cellulose with a proper solvent prior to an etherification reaction (Japanese Patent Application Unexamined Publication No. 58-196202/1983). During washing, however, not only water but also sodium hydroxide is washed away so that only methyl cellulose having a low degree of substitution is produced.

When preparation of an alkali cellulose is started using an aqueous sodium hydroxide solution having a high concentration, a method comprising steps of adding the alkali in an amount necessary for the etherification reaction to pulp powder obtained by pulverization of pulp and then mechanically mixing them as described in Japanese Patent Application Unexamined Publication Nos. 53-41356/1978 or 56-2302/1981 cannot uniformly distribute the alkali in the pulp powder. Accordingly, some portions of the pulp do not contact with the alkali so that they remain as they are without becoming cellulose ether. They are present as an unreacted substance in the product. Thus, there is a problem of poor quality of cellulose ether.

In a method comprising steps of immersing a pulp sheet in an excess alkali solution to allow the pulp to absorb a sufficient amount of the alkali and then pressing the sheet to remove an excess alkali for adjusting the alkali content to a predetermined level as described in Japanese Patent Application Unexamined Publication No. 49-61272/1974, when an aqueous sodium hydroxide solution having a high concentration is used, a solid matter (sodium hydroxide hydrate) precipitates from the aqueous sodium hydroxide solution unless it is maintained at a considerably high temperature. There is a problem of apparatus troubles caused by the precipitation.

SUMMARY OF THE INVENTION

The present invention provides a method for efficiently preparing alkali cellulose having the small water content and a uniform alkali distribution.

In the present invention, there is provided a method for preparing alkali cellulose, comprising steps of:

bringing pulp into continuous contact with 23 to 60% by weight of an alkali metal hydroxide solution to yield a contact mixture and draining the contact mixture by a continuous centrifugal separator.

In one of the preferred embodiments of the present invention, there is also provided a method for preparing alkali cellulose further comprising concentrating a part or all of an alkali metal hydroxide-containing liquid separated in the step of draining, wherein the concentrated alkali metal hydroxide-containing liquid is recycled in the step of brining pulp into continuous contact.

According to the present invention, also provided is a method for preparing cellulose ether comprising use of the alkali cellulose prepared.

According to the present invention, further provided is an apparatus for preparing alkali cellulose comprising:

a contactor for contacting pulp and an alkali metal hydroxide solution to generate a contact mixture, a centrifugal separator for separating the contact mixture into alkali cellulose and an alkali metal hydroxide-containing liquid, a concentrator for concentrating a part or all of the alkali metal hydroxide-containing liquid thus separated, and a tank for mixing the alkali metal hydroxide-containing liquid separated by the centrifugal separator and/or concentrated by the concentrator with an alkali metal hydroxide solution, wherein the mixture produced in the tank can be sent to the contactor and recycled for contacting pulp.

According to the present invention, alkali cellulose having the small water content and a uniform alkali distribution can be efficiently prepared. As a result, cellulose ether having a high etherification percentage and high transparency can be efficiently prepared.

DETAILED DESCRIPTION OF THE PREFERRED EMBODIMENT

Figure 1:
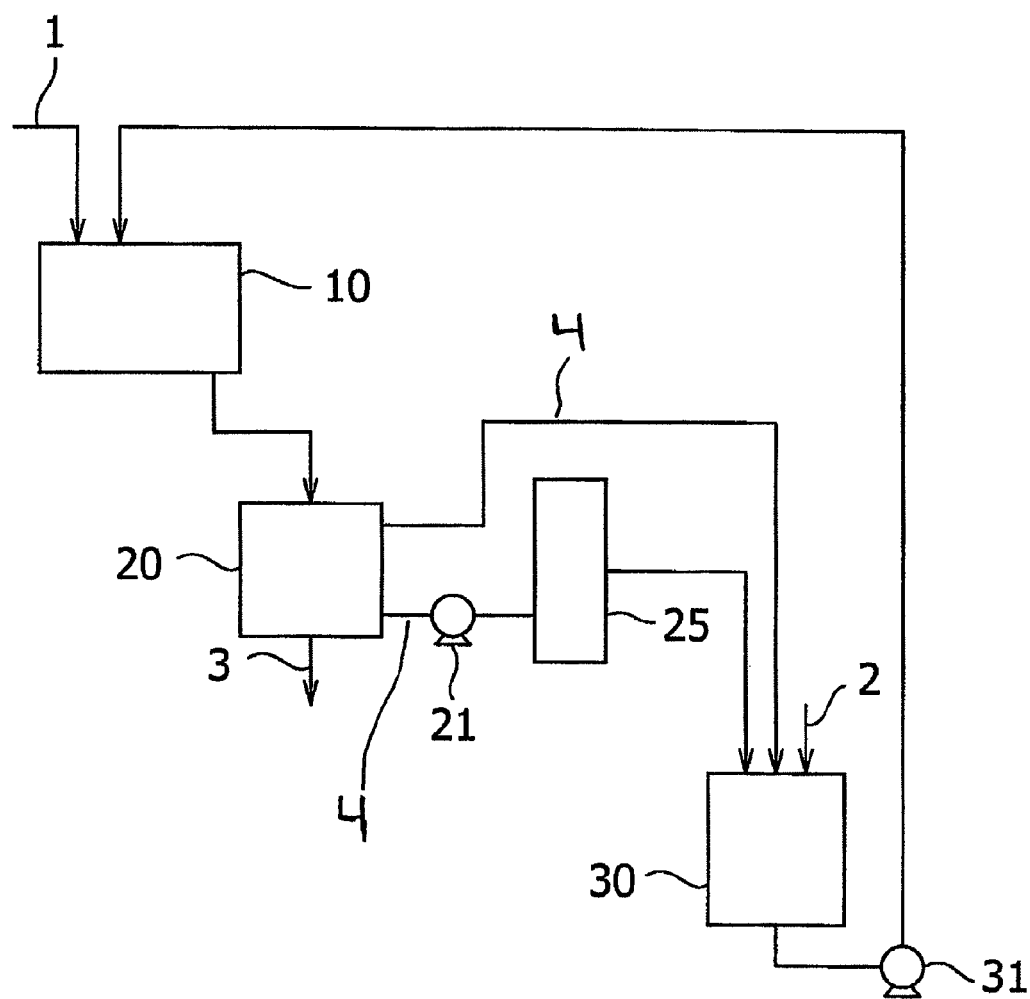
FIG. 1 illustrated an example of an apparatus for preparing alkali cellulose.

The pulp to be used in the present invention may be preferably in the form of a sheet, powder or chips.

The pulp powder may be available by pulverizing a pulp sheet and it is in the form of powder. An average particle size of the pulp powder may be, but not limited to, usually 10 to 1,000 μm. Although no limitation is imposed on the preparation method of the pulp powder, a pulverizer such as knife and hammer mill can be used.

Although no limitation is imposed on the preparation method of pulp chips, the pup chips may be produced by cutting a pulp sheet with a known cutting device such as a slitter cutter. A continuous cutting device may be advantageous from the viewpoint of investment cost.

The plane surface area of the chip may be usually 4 to 10,000 $mm^2$, especially preferably from 10 to 2,500 $mm^2$. It may be difficult to prepare the chip having the plane surface area smaller than 4 $mm^2$. The chip having a plane surface area greater than 10,000 $mm^2$ may pose difficulties in handling such as introducing into a contactor, transferring inside of the contactor, and introducing into a continuous centrifugal separator. Considering the pulp chip as a hexahedron, the plane surface area of the chip is the largest surface area of six surface areas of the hexahedral chip.

Of these pulp forms, pulp chips may be most preferred because they can be prepared easily and do not easily cause clogging of the pores of the centrifugal separator.

The apparatus for bringing the pulp to be used in the present invention into contact with the alkali metal hydroxide solution may be preferably one capable of adjusting times from the start of contact with the alkali metal hydroxide solution by dipping the pulp completely in the alkali metal hydroxide solution to the end of drain by a centrifugal separator in the later step and at the same time, having a narrow distribution of the times. More specifically, an apparatus having something close to a piston flow may be preferable. Examples may include a pipe type, a bucket conveyor type, a screw conveyor type, a belt conveyor type and a rotary feeder type.

If necessary, an adequate stirring or shearing force may be applied to the contact mixture to convert it into gruel.

In the present invention, a ratio of the weight of pulp to the volume of the alkali metal hydroxide solution to be used per hour may be preferably 0.15 kg/L or less, more preferably 0.10 kg/L or less, still more preferably 0.05 kg/L or less. When the ratio exceeds 0.15 kg/L, complete dipping may become difficult, leading to an uneven alkali distribution in the alkali cellulose. Thus, the quality of the product may be deteriorated. The lower limit of this ratio may be preferably 0.0001 kg/L. If this lower limit is not satisfied, the equipment may become impractically large.

It may be preferable that the apparatus to be used in the present invention for bringing the pulp into contact with the alkali metal hydroxide solution can control the temperature of the alkali metal hydroxide solution or the contact time freely. The composition of alkali cellulose varies depending on the absorbed amount of the alkali metal hydroxide solution by the pulp, and the absorbed amount can be adjusted by controlling the contact time and the temperature of the alkali metal hydroxide solution. Accordingly, the apparatus capable of controlling it can produce alkali cellulose having a desired composition.

Although the temperature of the alkali metal hydroxide solution can be controlled by a known technique, use of a heat exchanger may be preferred. The heat exchanger may be installed inside or outside the contactor. Although no particular limitation is imposed on the temperature of the alkali metal hydroxide solution, it may be preferably adjusted to be within a range of from 20 to 80° C. The contactor capable of carrying out continuous treatment may be preferred. A continuous apparatus can be made smaller in size than a batch system apparatus so that it is advantageous in space economy.

In the present invention, the contact time may be adjusted preferably by changing the length of a contact zone, changing the rotation speed if the apparatus is a screw conveyor or rotary feeder type, or changing the flow rate of the liquid if the apparatus is a pipe type. The contact time may be preferably from 1 second to 15 minutes, especially preferably from 2 seconds to 2 minutes. The Contact time of less than 1 second may make it very difficult to control the absorption amount. The contact time exceeding 15 minutes may require an excessively large apparatus or deteriorate productivity. In addition, the pulp may absorb too much amount of an alkali so that it may be difficult to prepare alkali cellulose having a desired composition suited for the preparation of cellulose ether no matter which draining apparatus is used.

It may be preferable that the apparatus for bringing the pulp into contact with the alkali metal hydroxide solution can treat them continuously. Such a continuous apparatus is advantageous over a batch apparatus in terms of space economy because the apparatus itself can be made smaller than the batch apparatus. It may be preferable that the contactor can let the pulp pass in a piston flow-like manner. Because the composition of alkali cellulose varies, depending on the contact time, smaller variation of the contact time can bring alkali cellulose having a more uniform composition so that a desired quality is obtained. Accordingly, it should not allow the pulp which has been supplied in the contactor to pass without contact with the alkali in order to obtain a good quality product. Since the pulp is apt to float in the alkali metal hydroxide solution, it may be preferable to allow the pulp to pass in the contactor while ensuring complete contact with the alkali metal hydroxide solution.

It may be preferred that the pulp and alkali metal hydroxide solution are charged successively in the contactor, or the pulp and alkali metal hydroxide solution are mixed prior to charging. In the latter case, the pulp and alkali metal hydroxide solution have already been brought into contact with each other so that the contact time including the contact time prior to charging is preferably controlled.

It may be preferable that the apparatus for bringing the pulp into contact with the alkali metal hydroxide solution can be evacuated or nitrogen-purged in order to prevent a reduction in the polymerization degree of the alkali cellulose in the presence of oxygen. If the control of the polymerization degree in the presence of oxygen is desired at the same time, the contactor having a structure capable of controlling an amount of oxygen is preferred.

No particular limitation may be imposed on the alkali metal hydroxide solution to be used in the invention insofar as alkali cellulose can be obtained using it. An aqueous solution of sodium hydroxide or potassium hydroxide may be preferred, with the former one being especially preferred from an economical viewpoint. The concentration of the solution may be preferably from 23 to 60% by weight, especially preferably from 35 to 55% by weight. When the concentration is less than 23% by weight, it may be economically disadvantageous because a side reaction between an etherifying agent and water occurs during the subsequent preparation of cellulose ether. Moreover, cellulose ether having a desired degree of substitution may not be obtained so that an aqueous solution of the cellulose ether thus prepared may be inferior in transparency. When the concentration exceeds 60% by weight, the solution may not be handled easily because of an increase in viscosity. The concentration of the alkali metal hydroxide solution to be provided for the contact with the pulp may be preferably kept constant in order to stabilize the composition of the alkali cellulose and ensure the transparency of the cellulose ether.

According to the invention, the uniformity of the alkali distribution can be improved even if an inert solvent such as lower alcohol preferably having 1 to 4 carbons is not used. However, use of such a solvent does not pose any problem. Use of such a solvent can improve uniformity of alkali distribution and bulk density of alkali cellulose.

The continuous centrifugal separator to be used in the present invention can separate a solid from a liquid by making use of a centrifugal force. Some continuous centrifugal separators have an imperforate rotor such as a decanter, while some have a perforated rotor such as a rotating basket. The centrifugal separators having an imperforate rotor are mainly used for centrifugal precipitation, while those having a perforated rotor are used for, in addition to the centrifugal precipitation, centrifugal filtration and centrifugal dehydration. A continuous centrifugal separator with a perforated rotor may be preferred because it facilitates drainage. Since the true density of the cellulose and the density of an aqueous sodium hydroxide solution are relatively close to each other, it is advantageous, from the viewpoint of the treatment capacity, to utilize centrifugal filtration and centrifugal dehydration in addition to the centrifugal precipitation, instead of depending only on the centrifugal precipitation. Examples of the continuous centrifugal separator with a perforated rotor may include an automated discharge type centrifugal dehydrator, a screw discharge type centrifugal dehydrator, an oscillation discharge type centrifugal dehydrator and an extrusion plate type centrifugal dehydrator. The term "dehydration" through these dehydrators means removal of not only "water" but also "liquid in general".

Of these centrifugal dehydrators, a screw discharge type centrifugal dehydrator and an extrusion plate type centrifugal dehydrator may be especially preferred from the industrial viewpoint because they can be operated with fewer troubles. A rotator having pores such as a rotation basket may include a conical type, a cylindrical type, a vertical type and a horizontal type. Although no particular limitation is imposed on the shape of the openings of the screen in the rotator having pores, wire mesh, circular pores, triangle pores, coneedles, slits or the like can be used. The pore size of the screen may be, but not limited to, preferably from 0.1 to 10 mm.

The continuous centrifugal separator can control the number of rotations depending on the contact time between pulp and an alkali metal hydroxide solution, the temperature and a drain degree. In other words, the continuous centrifugal separator can control a centrifugal effect. The control of the centrifugal effect can keep the concentration of the alkali metal hydroxide solution constant, the solution being fed repeatedly for the contact with the pulp. Consequently, cellulose ether having high transparency can be obtained. When the contact time is extended and/or the contact temperature is increased from the present operation condition, the centrifugal effect can be reduced. When the contact time and/or the contact temperature is lowered, the centrifugal effect can be increased. It may be preferable to keep the variation of the concentrations of the alkali metal hydroxide solution within ±10%, especially within 5%.

The centrifugal effect may be preferably 100 or higher, more preferably 200 or higher. When the centrifugal effect is lower than 100, the draining may be insufficient. Although the upper values of the centrifugal effect may not be limited, the typical upper limit among commercially available centrifugal separators may be 5,000 for example. When the centrifugal effect is within the above range, the concentration of the alkali metal hydroxide solution recycled after the below-mentioned recovery of the alkali metal hydroxide solution can be kept low.

If necessary, the alkali solution can be added dropwise or sprayed to the cake during draining.

Incidentally, the centrifugal effect is a value indicating a magnitude of the centrifugal force and is given by a ratio of the centrifugal force to the gravity (see "New Edition Chemical Engineering Dictionary Edited by Society for Chemical Engineers, Japan", published on May 30, 1974). The centrifugal effect Z is represented by the following equation.

$$Z=(\omega^2 r)/g=V^2/(gr)=\pi^2 N^2 r/(900\ g)$$

wherein "r" represents a rotational diameter (unit: m) of a rotator, "ω" represents an angular rate (unit: rad/sec) of a rotator, "V" represents a circumferential rate (unit: m/sec) of a rotator, "N" represents a rotational number (unit: rpm) of a rotator and "g" represents a gravitational acceleration (unit: m/sec$^2$).

The alkali solution recovered by draining can be recycled. When it is recycled, an alkali metal hydroxide solution may be preferably supplied to the system in an amount equal to that of the alkali metal hydroxide solution contained in the alkali cellulose taken out of the system. In this case, it is possible to charge a buffer tank with the alkali solution recovered by draining, transfer the solution from the buffer tank to a contactor, and then add a new alkali metal hydroxide solution so as to keep constant its level in the tank.

When the alkali solution recovered by draining is recycled so as to contact with the pulp, it may be especially preferable to concentrate the recovered solution using an appropriate means before the cycle. In this case, it may be preferable that the concentration of the recovered alkali metal hydroxide solution is lower than the concentration of the alkali metal hydroxide solution which has been fed for the contact with the pulp. Because the solution having lower concentration has higher vapor pressure, it is easier to concentrate the solution having lower concentration. The deposition of the solid caused by concentration can be also prevented. The concentration of the alkali metal hydroxide solution after concentrated may be preferably 23 to 65% by weight, especially preferably 35 to 60% by weight.

The concentrator for concentrating the recovered alkali metal hydroxide solution may preferably include, but not limited to, an evaporator. It may be preferably to carry out the evaporation under reduced pressure. The concentrator can be arranged at any place within the loop wherein the alkali metal hydroxide solution recovered by the centrifugal separator can be used repeatedly.

The concentrator can receive a part or all of the liquid separated by the centrifugal separator and concentrate it. It is also possible to transfer the liquid separated by the centrifugal separator into a buffer tank once, send the liquid from the buffer tank to a concentrator where the liquid is concentrated continuously, and then return the concentrate into the buffer tank. A concentrator may be arranged between the buffer tank and the contactor.

The amount of water removed by the concentrator may be preferably maintained to a level so that the concentration of the alkali metal hydroxide solution to be brought into contact with the pulp does not exceed the concentration of an alkali metal hydroxide solution to be replenished newly from outside the system. When the concentration is too high, a solid (sodium hydroxide hydrate) may precipitate from an aqueous sodium hydroxide solution unless the temperature is maintained high. Mechanical problems such as occlusion may also take place.

The water removed by the concentration may be discarded.

When the alkali solution recovered by draining is recycled, it may be especially preferable that both of a continuous centrifugal separator having a perforated rotor and a continuous centrifugal separator having an imperforate rotor are used together. This makes it possible to prevent the clogging of the centrifugal separator having a perforated rotor and prevent filtration failure or oscillation of the centrifugal separator caused thereby. First of all, a mixture obtained by the contact of the pulp with the alkali metal hydroxide solution is separated into a liquid and a solid by using a continuous centrifugal separator equipped with a perforated rotor. Then, the fine solid in the separated liquid is further separated by a continuous centrifugal separator having an imperforate rotor. A part or all of the liquid separated by the continuous centrifugal separator having a perforated rotor can be directly introduced into the continuous centrifugal separator having an imperforate rotor. Alternatively, it can be placed in the tank and then introduced into the continuous centrifugal separator having an imperforate rotor. The solid recovered from the separated liquid by the continuous centrifugal separator having an imperforate rotor can be used as alkali cellulose.

FIG. 1 illustrates an apparatus for preparing alkali cellulose comprising a contactor 10 for contacting pulp 1 and an alkali metal hydroxide solution 2 to generate a contact mixture; a centrifugal separator 20 for separating the contact mixture into alkali cellulose 3 and an alkali metal hydroxide-containing liquid 4; a concentrator 25 for concentrating a part or all of the alkali metal hydroxide-containing liquid 4 thus separated; and a tank 30 for mixing the alkali metal hydroxide-containing liquid 4 separated by the centrifugal separator and/or concentrated by the concentrator with an alkali metal hydroxide solution 2. The mixture produced in the tank 30 can be sent to the contactor and recycled for contacting pulp. In FIG. 1, the alkali metal hydroxide-containing liquid 4 separated by the centrifugal separator 20 is transferred to the concentrator 25 using pump 21, and the alkali metal hydroxide-containing liquid in tank 30 is transferred to the contactor 10 using pump 21.

Figure 2:
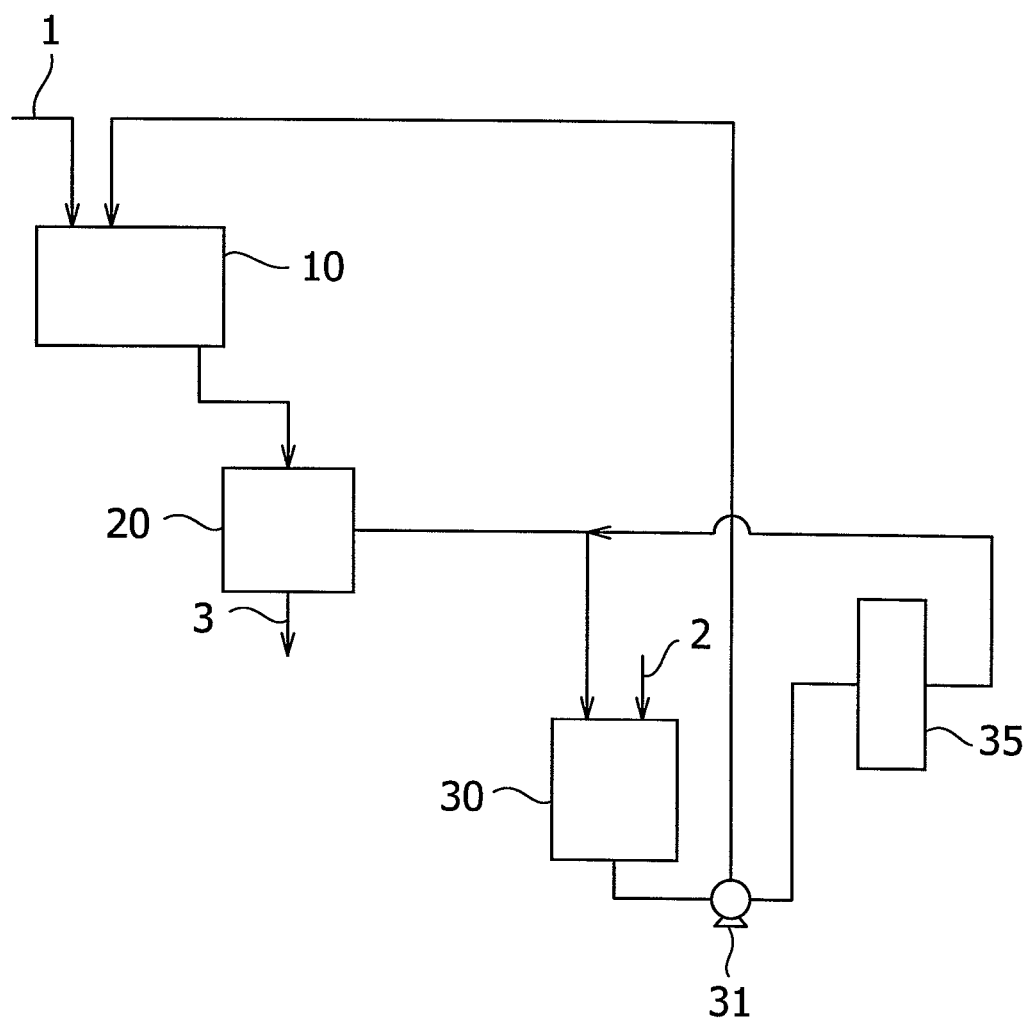
FIG. 2 illustrated an example of an apparatus for preparing alkali cellulose.

The concentrator 30 is place upstream of the tank 30 in FIG. 1. However, as shown in FIG. 2, the concentrator 35 may be placed downstream of the tank 30 wherein a part or all of a mixture of the alkali metal hydroxide-containing liquid separated by the centrifugal separator 20 and an alkali metal hydroxide-containing liquid is concentrated and returned to the tank. When the concentration of the alkali metal hydroxide in the tank becomes lower than the predetermined value, this embodiment allows the concentration in the tank 30 to be back to the predetermined value without further addition of an alkali metal hydroxide.

A weight ratio of the alkali metal hydroxide contained by the cake obtained by draining to the solid portion contained by the pulp (alkali metal hydroxide/solid portion in the pulp) may be preferably 0.3 to 1.5, more preferably 0.65 to 1.30, still more preferably 0.90 to 1.30. When the weight ratio falls within a range of 0.3 to 1.5, the cellulose ether thus obtained has transparency improved. The solid portion in the pulp may include, in addition to cellulose which is a main component, hemicellulose, lignin, organic matters such as a resin, and inorganic matters such as Se and Fe components.

The weight ratio of (alkali metal hydroxide)/(solid portion in the pulp) can be determined by the following titration method.

First, 4.00 g of a cake is sampled and the weight percentage (wt %) of the alkali metal hydroxide contained in the cake is determined by neutralization titration (0.5 mol/L $H_2SO_4$, indicator: phenolphthalein). A blank test is also performed in a similar manner.

Wt % of alkali metal hydroxide=(normality factor)× {(dropped amount (ml) of $H_2SO_4$)−(dropped amount (ml) of $H_2SO_4$ in blank test)}

Using the wt % of alkali metal hydroxide contained in the cake, a weight ratio of the alkali metal hydroxide to the solid portion contained by the pulp is then determined in accordance with the following equation:

(weight of alkali metal hydroxide)/(weight of solid portion in pulp)=(wt % of alkali metal hydroxide)÷[{100−(wt % of alkali metal hydroxide)/(B/100)}×(S/100)].

In the above equation, "B" represents the concentration (wt %) of the alkali metal hydroxide solution and "S" represents the concentration (wt %) of the solid portion in the pulp. The concentration of the solid portion in the pulp is obtained by dividing the residual weight after drying about 2 g of sampled pulp at 105° C. for 2 hours, by the weight of the sampled pulp and is expressed as weight percentage.

A feed rate of the pulp to the contactor; and a recovery rate of alkali cellulose after draining, or a consumption rate of the alkali metal hydroxide solution are measured. The composition of the alkali cellulose at present is calculated based on their weight ratio. The contact time, a temperature of the alkali metal hydroxide solution in the contactor, or a draining pressure can be controlled so as to conform the calculated composition to a target composition. The above-described measurements, calculation and controlling operations can be automated.

The composition of the alkali cellulose can be determined by the etherification degree of cellulose ether obtained from the alkali cellulose, that is, the molar substitution degree or value.

Using the alkali cellulose obtained by the above-described preparation method as a raw material, cellulose ether can be prepared in a known manner.

The reaction method may include a batch type or a continuous type. The continuous type is employed for the preparation of the alkali cellulose according to the present invention so that continuous type for the preparation of cellulose ether is preferred, but the batch type is feasible.

In the batch type, the alkali cellulose discharged from the drainer may be stored in a buffer tank or charged directly in an etherification reactor. It may be preferable to store the alkali cellulose in the buffer tank and then charge the alkali cellulose in a reaction vessel in a short period of time in order to reduce its occupancy time in the etherification reactor. This leads to an increase in productivity. The buffer tank is preferably evacuated or purged with nitrogen so as to form an oxygen-free atmosphere therein, whereby a reduction in the polymerization degree can be suppressed.

Examples of cellulose ether obtainable from the resulting alkali cellulose as a starting material may include alkyl cellulose, hydroxyalkyl cellulose, hydroxyalkylalkyl cellulose and carboxymethyl cellulose.

Examples of the alkyl cellulose may include methyl cellulose having a methoxyl group of 1.0 to 2.2 (D.S.) and ethyl cellulose having an ethoxyl group of 2.0 to 2.6 (D.S.). It should be noted that D.S. (degree of substitution) means the average number of substituted hydroxyl groups in the anhydrous glucose unit, while M.S. (molar substitution) means the average number of substituents in the anhydrous glucose unit.

Examples of the hydroxyalkyl cellulose may include hydroxyethyl cellulose having a hydroxyethoxyl group of 0.05 to 3.0 (M.S.) and hydroxypropyl cellulose having a hydroxypropoxyl group of 0.05 to 3.3 (M.S.).

Examples of the hydroxyalkylalkyl cellulose may include hydroxyethylmethyl cellulose having a methoxyl group of 1.0 to 2.2 (D.S.) and a hydroxyethoxyl group of 0.1 to 0.6 (M.S.), hydroxypropylmethyl cellulose having a methoxyl group of 1.0 to 2.2 (D.S.) and a hydroxypropoxyl group of 0.1 to 0.6 (M.S.), and hydroxyethylethyl cellulose having an ethoxyl group of 1.0 to 2.2 (D.S.) and a hydroxyethoxyl group of 0.1 to 0.6 (M.S.).

Carboxymethyl cellulose having a carboxymethoxyl group of 0.2 to 2.2 (D.S.) can also be given as an example of cellulose ether.

Examples of the etherifying agent may include alkyl halide such as methyl chloride and ethyl chloride; alkylene oxide such as ethylene oxide and propylene oxide; and monochloroacetic acid.

EXAMPLES

The present invention will hereinafter be described by Examples. It should not be construed that the present invention is limited to or by these Examples.

Example 1

A pipe having an inner diameter of 38 mm and length of 10 m was installed. A snake pump ("NVL40PL", supplied by Heishin, Ltd.) equipped with a hopper was connected to the inlet of the pipe. In the hopper of the snake pump, a 23 wt % aqueous sodium hydroxide solution of 40° C. was supplied at a rate of 900 L/hr. At the same time, 4-mm square pulp chips produced by wood and having a solid concentration of 93 wt % were charged at a rate of 50 kg/hr in the hopper. The outlet of the pipe was connected to a screw discharge type continuous rotating basket. A mixture of the pulp chips and the sodium hydroxide solution discharged from the pipe was drained continuously at a centrifugal effect of 1150. The weight ratio of the alkali metal hydroxide contained by the resulting alkali cellulose to the solid portion contained by the pulp, which was determined by the titration method, was 1.25.

The alkali cellulose (5.5 kg in terms of a cellulose content) thus obtained was placed in a pressure reactor. After vacuuming, 11 kg of methyl chloride and 2.7 kg of propylene oxide were added to start a reaction. The subsequent washing, drying and pulverizing of the reaction product produced hydroxypropylmethyl cellulose. The substitution degree of the cellulose ether, the viscosity at 20° C. of a 2 wt % aqueous solution thereof, and the light transmittance at 20° C. of a 2 wt % aqueous solution thereof were measured. The results are shown in Table 1. The light transmittance at 20° C. of a 2 wt % aqueous solution thereof was measured using a photoelectric calorimeter "PC-50", a cell length of 20 mm and visible light.

Example 2

In a similar manner to Example 1 except that a 30 wt % aqueous sodium hydroxide solution of 40° C. was fed at a rate of 1,300 L/hr, alkali cellulose was obtained. The weight ratio of the alkali metal hydroxide contained by the resulting alkali cellulose to the solid portion contained by the pulp, which was determined by the titration method, was 1.25.

In a similar manner to Example 1, cellulose ether was prepared using the alkali cellulose thus obtained. The viscosity at 20° C. of a 2 wt % aqueous solution of the resulting cellulose ether and the light transmittance at 20° C. of a 2 wt % aqueous solution thereof are shown in Table 1.

Example 3

A screw conveyor having a screw diameter of 154 mm, a shaft diameter of 90 mm, a screw length of 1,500 mm and a screw pitch of 100 mm was installed and rotated at 30 rpm. Pulp chips similar to those employed in Example 1 were charged in a screw-conveyor type immersion tank at a rate of 50 kg/hr. At the same time, a 40 wt % aqueous sodium hydroxide solution of 40° C. was supplied from the supply port of sodium hydroxide at a rate of 1,700 L/hr. As a continuous centrifugal separator, an extrusion plate type centrifugal dehydrator equipped with a 0.2 mm slit screen was installed at the outlet of the screw conveyor type immersion tank. A contact mixture of pulp chips and the sodium hydroxide solution discharged from the screw conveyor type immersion tank was continuously drained at a centrifugal effect of 1,000. The weight ratio of the alkali metal hydroxide contained by the resulting alkali cellulose to the solid portion contained by the pulp, which was determined by the titration method, was 1.25.

In a similar manner to Example 1, cellulose ether was prepared using the alkali cellulose thus obtained. The viscosity at 20° C. of a 2 wt % aqueous solution of the resulting cellulose ether and the light transmittance at 20° C. of a 2 wt % aqueous solution thereof are shown in Table 1.

Example 4

A rotary feeder type apparatus (rotating filter) having a drum inner diameter of 240 mm, a chamber height of 15 mm, a chamber width of 100 mm and a screen size of 80 μm was installed. The rotation speed of the drum was set at 75 rph. Pulp chips similar to those used in Example 1 were charged in this rotary feeder type apparatus at a feed rate of 15 kg/hr and at the same time, a 49 wt % aqueous sodium hydroxide solution of 40° C. was supplied at a rate of 450 L/hr.

An extrusion plate type centrifugal dehydrator equipped with a 0.2 mm slit screen was installed as a continuous centrifugal separator at the outlet of the rotary feeder type apparatus. A contact mixture of the pulp chips and the sodium hydroxide solution discharged from the rotary feeder type apparatus was continuously drained at a centrifugal effect of 1,000. The weight ratio of the alkali metal hydroxide contained by the resulting alkali cellulose to the solid portion contained by the pulp, which was determined by the titration method, was 1.25.

In a similar manner to Example 1, cellulose ether was prepared using the alkali cellulose thus obtained. The viscosity at 20° C. of a 2 wt % aqueous solution of the resulting cellulose ether and the light transmittance at 20° C. of a 2 wt % aqueous solution thereof are shown in Table 1.

Example 5

In a similar manner to Example 4 except for use of a 55 wt % aqueous sodium hydroxide solution, alkali cellulose was obtained. The weight ratio of the alkali metal hydroxide contained by the resulting alkali cellulose to the solid portion contained by the pulp, which was determined by the titration method, was 1.25.

In a similar manner to Example 1, cellulose ether was prepared using the alkali cellulose thus obtained. The viscosity at 20° C. of a 2 wt % aqueous solution of the resulting cellulose ether and the light transmittance at 20° C. of a 2 wt % aqueous solution thereof are shown in Table 1.

Example 6

A rotary feeder type apparatus (rotating filter) having a drum inner diameter of 240 mm, a chamber height of 15 mm, a chamber width of 100 mm and a screen diameter of 80 μm was installed. The rotation speed of the drum was set at 110 rph. Pulp chips similar to those used in Example 1 were charged in this rotary feeder type apparatus at a feed rate of 15 kg/hr and at the same time, a 44 wt % aqueous sodium hydroxide solution of 40° C. was fed at a rate of 450 L/hr.

An extrusion plate type centrifugal dehydrator equipped with a 0.2 mm slit screen was installed as a continuous centrifugal separator at the outlet of the rotary feeder type apparatus. A contact mixture of the pulp chips and the sodium hydroxide solution discharged from the rotary feeder type apparatus was continuously drained at a centrifugal effect of 600. The liquid thus separated was charged in a tank and recycled for the contact with the pulp. A 49 wt % aqueous sodium hydroxide solution was supplied continuously to the tank so as to keep the solution level in the tank constant. The concentration in the tank was kept at 44 wt %. The weight ratio of the alkali metal hydroxide contained by the resulting alkali cellulose to the solid portion contained by the pulp, which was determined by the titration method, was 1.00.

In a similar manner to Example 1 except that 9 kg of methyl chloride and 1.4 kg of propylene oxide were added, cellulose ether was prepared. The viscosity at 20° C. of a 2 wt % aqueous solution of the resulting cellulose ether and the light transmittance at 20° C. of a 2 wt % aqueous solution thereof are shown in Table 1.

Example 7

A rotary feeder type apparatus (rotating filter) having a drum inner diameter of 240 mm, a chamber height of 15 mm, a chamber width of 100 mm and a screen diameter of 80 μm was installed. The rotation speed of the drum was set at 110 rph. Pulp chips similar to those used in Example 1 were charged in this rotary feeder type apparatus at a feed rate of 15 kg/hr and at the same time, a 44 wt % aqueous sodium hydroxide solution of 40° C. was fed at a rate of 450 L/hr.

An extrusion plate type centrifugal dehydrator equipped with a 0.2 mm slit screen was installed as a continuous centrifugal separator at the outlet of the rotary feeder type apparatus. A contact mixture of the pulp chips and the sodium hydroxide solution discharged from the rotary feeder type apparatus was continuously drained at a centrifugal effect of 600. The liquid thus separated was charged in a tank. It was sent from the tank to a decanter which was under operation at a centrifugal effect of 2500, whereby a fine solid was recovered. The fine solid thus recovered was mixed in alkali cellulose. The liquid passing through the decanter was then returned to the tank and recycled for the contact with the pulp. A 49 wt % aqueous sodium hydroxide solution was supplied continuously to the tank so as to keep a solution level in the tank constant. The concentration of the solution in the tank was kept at 44 wt %. The weight ratio of the alkali metal hydroxide contained by the resulting alkali cellulose to the solid portion contained by the pulp, which was determined by the titration method, was 1.00.

In a similar manner to Example 1 except that 9 kg of methyl chloride and 1.4 kg of propylene oxide were added, cellulose ether was prepared. The viscosity at 20° C. of a 2 wt % aqueous solution of the resulting cellulose ether and the transmittance at 20° C. of a 2 wt % aqueous solution thereof are shown in Table 1.

Example 8

In a similar manner to Example 7 except that the temperature of the 44 wt % aqueous sodium hydroxide solution was decreased to 20° C. and the centrifugal effect of the extrusion plate type centrifugal dehydrator was raised to 1000, alkali cellulose was obtained. The concentration of the aqueous sodium hydroxide solution in the tank was kept at 44 wt %. The weight ratio of the alkali metal hydroxide contained by the resulting alkali cellulose to the solid portion contained by the pulp, which was determined by the titration method, was 0.60.

In a similar manner to Example 1 except that 6.5 kg of methyl chloride and 1.2 kg of propylene oxide were added, cellulose ether was prepared. The viscosity at 20° C. of a 2 wt % aqueous solution of the resulting cellulose ether and light transmittance at 20° C. of a 2 wt % aqueous solution thereof are shown in Table 1.

Example 9

In a similar manner to Example 7 except that the rotation speed of the rotary feeder type apparatus was changed to 75 rph and the centrifugal effect of the extrusion plate type centrifugal dehydrator was decreased to 300, alkali cellulose was obtained. The concentration of the aqueous sodium hydroxide solution in the tank was kept at 44 wt %. The weight ratio of the alkali metal hydroxide contained by the resulting alkali cellulose to the solid portion contained by the pulp, which was determined by the titration method, was 1.25.

In a similar manner to Example 1, cellulose ether was prepared using the alkali cellulose thus obtained. The viscosity at 20° C. of a 2 wt % aqueous solution of the resulting cellulose ether and the light transmittance at 20° C. of a 2 wt % aqueous solution thereof are shown in Table 1.

Example 10

In a similar manner to Example 7 except that the rotation speed of the rotary feeder type apparatus was changed to 75 rph, alkali cellulose was prepared. The centrifugal effect of the extrusion plate type centrifugal dehydrator was set at 600 without change. The concentration of the aqueous sodium hydroxide solution in a tank became 46 wt %. The weight ratio of the alkali metal hydroxide contained by the resulting alkali cellulose to the solid components contained by the pulp, determined by the titration method, was 1.00.

In a similar manner to Example 1, cellulose ether was prepared using the alkali cellulose thus obtained. The viscosity at 20° C. of a 2 wt % aqueous solution of the resulting cellulose ether and the transmittance at 20° C. of a 2 wt % aqueous solution thereof are shown in Table 1.

Example 11

In a similar manner to Example 6 except that the liquid separated by the continuous centrifugal separator was continuously concentrated by an evaporator so as to remove water at a rate of 3.1 kg/hr, alkali cellulose was prepared. The concentration of the aqueous sodium hydroxide solution in the tank was 49 wt %. The weight ratio of the alkali metal hydroxide contained by the resulting alkali cellulose to the solid portion contained by the pulp, which was determined by the titration method, was 1.00.

In a similar manner to Example 1 except that 9 kg of methyl chloride and 2.4 kg of propylene oxide were added, cellulose ether was prepared. The viscosity at 20° C. of a 2 wt % aqueous solution of the resulting cellulose ether and the light transmittance at 20° C. of a 2 wt % aqueous solution thereof are shown in Table 1.

TABLE 1

| | Substitution degree of cellulose ether | | Aqueous 2 wt % solution of cellulose ether | |
|---|---|---|---|---|
| | Methoxyl group (DS) | Hydroxypropoxyl group (MS) | Viscosity (mPa.s) | Transmittance at 20° C. (%) |
| Example 1 | 1.70 | 0.17 | 9990 | 90.0 |
| Example 2 | 1.75 | 0.20 | 10100 | 94.0 |
| Example 3 | 1.82 | 0.22 | 9980 | 96.0 |
| Example 4 | 1.90 | 0.25 | 10000 | 98.0 |
| Example 5 | 1.95 | 0.29 | 10050 | 97.0 |
| Example 6 | 1.80 | 0.15 | 10010 | 96.5 |
| Example 7 | 1.80 | 0.15 | 10040 | 96.5 |
| Example 8 | 1.40 | 0.20 | 10010 | 93.0 |
| Example 9 | 1.90 | 0.25 | 10020 | 98.5 |
| Example 10 | 1.90 | 0.25 | 9990 | 97.0 |
| Example 11 | 1.90 | 0.25 | 10000 | 98.8 |

The invention claimed is:

1. A method for preparing a cellulose ether, comprising the steps of:
bringing pulp into continuous contact with 35 to 60% by weight aqueous solution of alkali metal hydroxide to generate a contact mixture consisting essentially of alkali cellulose and unreacted alkali metal hydroxide solution, said pulp is in the form of chips;
draining the contact mixture using a continuous centrifugal separator to separate a cake comprising the alkali cellulose from an alkali metal hydroxide containing liquid, wherein said centrifugal separator is a continuous centrifugal separator comprising a perforated rotor; and
etherifying the alkali cellulose obtained in the draining step with an etherifying agent to produce cellulose ether,
wherein the alkali metal hydroxide containing liquid obtained in the draining step is subjected to addition of a new alkali metal hydroxide solution and recycled into said step of bringing pulp into continuous contact in an amount equal to an amount of the alkali metal hydroxide solution contained in the alkali cellulose so as to keep the concentration of the alkali metal hydroxide solution constant in the step of bringing pulp into continuous contact.

2. The method according to claim 1, wherein a weight ratio of alkali metal hydroxide contained by the cake obtained in said draining step to a solid portion contained by said pulp is 0.3 to 1.5.

3. A method of according to claim 1, wherein the pulp is in the form of chips having a plane surface area from 4 to 10,000 mm².

4. A method of according to claim 1, wherein the pulp is in the form of chips having a plane surface area from 10 to 2,500 mm².

5. A method according to claim 1, wherein in bringing pulp into continuous contact with 35 to 60% by weight aqueous solution of alkali metal hydroxide, the pulp is present in a ratio of the weight of pulp to volume of alkali metal hydroxide solution to be used per hour of 0.15 kg/L or less.

6. A method for preparing a cellulose ether, comprising the steps of:
bringing pulp into continuous contact with 35 to 60% by weight aqueous solution of alkali metal hydroxide to generate a contact mixture consisting essentially of alkali cellulose and unreacted alkali metal hydroxide solution, said pulp is in the form of chips;
draining the contact mixture using a continuous centrifugal separator to separate a cake comprising the alkali cellulose from an alkali metal hydroxide containing liquid, wherein said centrifugal separator is a continuous centrifugal separator comprising a perforated rotor and said alkali metal hydroxide containing liquid having an alkali metal hydroxide concentration less than that of the alkali metal hydroxide concentration of the contact mixture; and
etherifying the alkali cellulose obtained in the draining step with an etherifying agent to produce cellulose ether,
wherein the 35 to 60% by weight alkali metal hydroxide solution is maintained at a constant predetermined concentration by mixing the alkali metal hydroxide containing liquid obtained in the draining step with a new alkali metal hydroxide solution having an alkali metal hydroxide concentration greater than the alkali metal hydroxide concentration of the alkali metal hydroxide containing liquid to form the 35 to 60% by weight alkali metal hydroxide solution used in the step of bringing pulp into continuous contact with the alkali metal hydroxide solution so as to keep the concentration of the 35 to 60% by weight alkali metal hydroxide solution constant in the step of bringing pulp into continuous contact.

7. The method according to claim 6, wherein the alkali metal hydroxide containing liquid and new alkali metal hydroxide solution are mixed in a tank and recycled to said step of bringing pulp into continuous contact with alkali metal hydroxide.

8. The method according to claim 7, wherein the alkali metal hydroxide containing liquid obtained in the draining step is directly added into the tank from the draining step for mixing with the new alkali metal hydroxide solution.

9. The method according to claim 7, wherein the alkali metal hydroxide containing liquid obtained in the draining step is concentrated prior to mixing with the new alkali metal hydroxide solution.

10. A method of according to claim 6, wherein the pulp is in the form of chips having a plane surface area from 4 to 10,000 mm².

11. A method of according to claim 6, wherein the pulp is in the form of chips having a plane surface area from 10 to 2,500 mm².

12. A method for preparing a cellulose ether, comprising the steps of:
bringing pulp into continuous contact with 35 to 60% by weight aqueous solution of alkali metal hydroxide to generate a contact mixture consisting essentially of alkali cellulose and unreacted alkali metal hydroxide solution, said pulp is in the form of chips;
centrifuging the contact mixture with a continuous centrifugal separator comprising a perforated rotor to separate solid alkali cellulose from an alkali metal hydroxide containing liquid; and
etherifying the alkali cellulose obtained in the centrifuging step with an etherifying agent to produce cellulose ether.

13. A method of according to claim 12, wherein the pulp is in the form of chips having a plane surface area from 4 to 10,000 mm².

14. A method of according to claim 12, wherein the pulp is in the form of chips having a plane surface area from 10 to 2,500 mm².

15. A method of according to claim 12, comprising bringing pulp into continuous contact with a 40-49% by weight aqueous solution of alkali metal hydroxide.

\* \* \* \* \*